US012709655B2

(12) United States Patent
Karimipour et al.

(10) Patent No.: US 12,709,655 B2
(45) Date of Patent: Aug. 18, 2026

(54) GAS PHASE PRODUCTION OF POLYETHYLENE

(71) Applicant: ExxonMobil Chemical Patents Inc., Baytown, TX (US)

(72) Inventors: Shayan Karimipour, Katy, TX (US); Michael E. Sieloff, Houston, TX (US); Benjamin J. Ohran, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1102 days.

(21) Appl. No.: 17/756,935

(22) PCT Filed: Nov. 12, 2020

(86) PCT No.: PCT/US2020/060205

§ 371 (c)(1),
(2) Date: Jun. 6, 2022

(87) PCT Pub. No.: WO2021/118751

PCT Pub. Date: Jun. 17, 2021

(65) Prior Publication Data

US 2023/0002522 A1 Jan. 5, 2023

Related U.S. Application Data

(60) Provisional application No. 62/946,603, filed on Dec. 11, 2019.

(51) Int. Cl.
*C08F 110/02* (2006.01)
*C08F 2/34* (2006.01)

(52) U.S. Cl.
CPC .................................. *C08F 110/02* (2013.01)

(58) Field of Classification Search
None
See application file for complete search history.

(56) References Cited

U.S. PATENT DOCUMENTS 4,421,523 A 12/1983 Mehta et al.
4,858,144 A 8/1989 Marsaly et al.
(Continued)

FOREIGN PATENT DOCUMENTS

EP 0233787 B1 * 8/1990 ................ C08F 2/34

OTHER PUBLICATIONS

Zhang, et al., "A Practical Method to Estimate the Bed Height of a Fluidized Bed of Fine Particles," Chem. Eng. Technol. 2008, 31, No. 12, 1735-1742. (Year: 2008).*
(Continued)

*Primary Examiner* — Fred M Teskin
(74) *Attorney, Agent, or Firm* — C. Tumey Law Group PLLC

(57) ABSTRACT

Methods for producing a polymer include contacting at least one monomer under polymerization conditions with a fluidized bed of a polymerization catalyst on a particulate support; measuring a plurality of pressures of the fluidized bed at a plurality of locations corresponding to increasing heights from a bottom of the fluidized bed; calculating a plurality of pressure drops between the plurality of locations based on the measured pressures; performing a regression analysis on the calculated plurality of pressure drops; correlating the plurality of pressure drops to corresponding heights from the bottom of the fluidized bed based on the regression analysis; determining a height of the fluidized bed based on the correlating; and controlling polymerization conditions based on the determined height of the fluidized bed. The method can also be used to detect malfunctioning pressure transducers based on deviation between measured and expected values.

6 Claims, 9 Drawing Sheets

(56) References Cited

U.S. PATENT DOCUMENTS

| | | | | |
|---|---|---|---|---|
| 5,688,865 | A | 11/1997 | Ali et al. | |
| 6,759,489 | B1 * | 7/2004 | Turkistani | C08F 210/16 526/67 |
| 2007/0003450 | A1 | 1/2007 | Burdett et al. | |
| 2012/0283395 | A1 * | 11/2012 | Hendrickson | B01J 8/224 422/111 |
| 2018/0162969 | A1 | 6/2018 | Lowell et al. | |

OTHER PUBLICATIONS

Sun, Jingyuan et al. (2017), "Online measurement of particle charge density in a gas-solid bubbling fluidized bed through electrostatic and pressure sensing", Powder Technology, vol. 317 (Apr. 7, 2017), pp. 471-480.

Akbari, Vahid et al. (2015), "2D CFD-PBM simulation of hydrodynamic and particle growth in an industrial gas phase fluidized bed polymerization reactor", Chem. Engineering Research and Design, vol. 104 (Jul. 26, 2015), pp. 53-67.

Zhang Qing, et al. (2016), "A comparative study of electrostatic current and pressure signals in a MSFC gas-solid fluidized bed", Powder Technology, vol. 287 (Jan. 1, 2016), pp. 292-300.

* cited by examiner

GAS PHASE PRODUCTION OF POLYETHYLENE

CROSS-REFERENCE OF RELATED APPLICATIONS

This application is a National Phase Application claiming priority to PCT Application Serial No. PCT/US2020/060205, filed Nov. 12, 2020, which claims the benefit of U.S. Provisional Application 62/946,603 filed Dec. 11, 2019 entitled "Gas Phase Production of Polyethylene", the entireties of which are incorporated by reference herein.

FIELD

This invention relates to the gas phase production of polyolefins. Specifically, embodiments of this invention relate to controlling the height of a fluidized bed used during the production of polyolefins.

BACKGROUND

In the gas phase process for the production of polyolefins, such as polyethylene, a gaseous alkene (e.g., ethylene), hydrogen, co-monomer (e.g., 1-hexene) and other raw materials are converted to a solid polyolefin product. Generally, gas phase reactors include a fluidized bed reactor, a compressor, and a cooler (heat exchanger). The reaction is maintained in a two-phase fluidized bed of granular polyethylene and gaseous reactants by a fluidizing gas which is passed through a distributor plate near the bottom of the reactor vessel. Catalyst is injected into the fluidized bed, while heat of reaction is transferred to the circulating gas stream. This gas stream is compressed and cooled in an external recycle line and then is reintroduced into the bottom of the reactor where it passes through the distributor plate. Make-up feedstreams are added to maintain the desired reactant concentrations.

Operation of most reactor systems is critically dependent upon good mixing for uniform reactor conditions, heat removal, and effective catalyst performance. The process must be controllable and capable of a high production rate. In general, the higher the operating temperature, the greater the capability to achieve high production rate. Because polymerization reactions are typically exothermic, heat transfer out of the reactor is critical to avoid such problems as particle agglomeration and runaway reactions. However, as the operating temperature approaches and exceeds the melting point of the polyolefin product, the particles of polyolefin become tacky and melt. For example, non-uniform fluidization of the bed can create "hot spots," which in turn can cause the newly-formed polymer particles to become tacky due to elevated temperatures in the hot spots.

An interplay of forces may result in particles agglomerating with adjacent particles, and may lead to sheeting and other forms of reactor fouling. In agglomeration, the particles stick together, forming agglomerated particles that affect fluid flow and may be difficult to remove from the system. In sheeting, tacky particles gather on a surface of the reactor system, such as the wall of the reactor vessel, forming a sheet of polymer particles. Progressive cycles in this process may eventually result in the growth of the sheet and its falling into the fluid bed. These sheets can interrupt fluidization, circulation of gas and withdrawal of the product from the reactor, and may require a reactor shutdown for removal.

Many factors influence the propensity for sheeting and other fouling phenomena, of which one is the type of catalyst. For example, metallocene catalysts allow the production of polyolefins with unique properties such as narrow molecular weight distributions and narrow chemical compositions. These properties in turn result in improved structural performance in products made with the polymers, such as greater impact strength and clarity in films. However, while metallocene catalysts have yielded polymers with improved characteristics, they have presented particular drawbacks when used in fluidized bed reactors, in particular in relation to sheeting and fouling in other portions of the reactor system, such as the distributor plate and the cooler. Thus, accurate control of many reaction parameters is vital in the fluid bed polymerization of olefins, especially using metallocene catalysts.

For example, fluidized bed level is one of the critical variables used for stable operation and control of a fluid bed olefin polymerization reactor. Bed level is directly related to the fluidization quality, reactor resin and catalyst inventory, and temperature distribution. It influences effective cooling, resin carry-over and compressor, cooler and plate fouling, and dome sheeting. Although operation at low or high bed levels is sometimes helpful in mitigating some reactor operability issues, very low or high levels need to be carefully avoided as they may result in severe reactor upsets and reactor shut down if not mitigated. For example, for metallocene runs in particular, deviation of more than 0.5 ft in fluid bed level is generally deemed unacceptable as there is evidence that this kind of offset can contribute to dome sheeting and plate fouling and other problems leading to premature shutdown and cleanup.

The currently used methods for calculating the bed level in fluidized-bed polyolefin reactors are based on using pressure drop measurements for different bed segments. Pressure drop in a fluidized bed increases as the fluidizing gas velocity increases in the fixed bed until the gas velocity is high enough to suspend the particles in a fluidized form. At this point, which is called minimum or incipient fluidization, the pressure drop across the bed is equal to the weight of the particle bed since the weight of the gas can be neglected. As the velocity increases beyond minimum fluidization, the pressure drop does not increase appreciably as the solid bed is already lifted and fluidized, and the extra drag by higher velocity is used to expand the fluidized bed and increase the bed level. Since the pressure drop is caused by particle suspension, the bulk density of the bed at each height is equal to the pressure drop gradient between two heights of the bed which can be directly measured. One or a weighted average of two or more bulk densities are then used to calculate the bed level. Relying on one or few specific pressure measurements with fixed weighted averaging makes these methods very sensitive in case of malfunction or drift of any of the used pressure monitoring devices. As the measurements are conducted at different heights, an expected value for the bulk density or pressure drop at each height is not available and it is usually confusing and difficult for the operators to detect the defective device. Moreover, the procedures that are typically used for the bed level cross-check are usually ineffective as they suffer from not having a baseline for comparison.

There is therefore a need for an improved method of monitoring bed level in fluidized bed olefin polymerization reactors as well as detecting malfunctioning pressure sensors.

SUMMARY

The method proposed in accordance with the present invention takes advantage of the linear or quasi-linear variation of the pressure drop across a fluidized bed. As can be seen in FIG. 2, the trend remains linear across the main part of the bed height and deviates from linearity only when approaching the bed surface. However, that deviation may have a crucial effect on the bed level calculation. By applying a linear or polynomial, for example $2^{nd}$ degree polynomial, regression analysis on the pressure drop measurements, the model governing the variation of the pressure drop with height can be deduced. As the pressure drop approaches zero at the surface, where no particles are present to cause pressure drop, extrapolating the model to zero pressure drop will result in the bed level. This way all the measurements are used at once and no single defective measurement has a devastating effect on the level calculation. Furthermore, the profile of the pressure drop calculated in this way provides an expected value for the pressure drop between each two heights which can be used to detect any defective pressure transducers and/or transmitters (note that pressure transducer and pressure transmitter are used interchangeably herein to reference any device suitable for measuring pressure and converting such measurement to an electronic signal; and optionally further able to transmit and/or amplify such signal). The variation of the fluidized bulk density across the fluidized bed can also be calculated from the calculated pressure drop profile. A healthy bulk density profile across the bed height, slightly decreasing from bottom of the bed to the top, is a measure of reactor stability and good resin morphology. A very high or very low bulk density may cause operability problems such as poor catalyst distribution, and resin agglomeration.

Thus, in one aspect, the present invention resides in a process of producing a polyolefin comprising:

(a1) contacting at least one olefin monomer under polymerization conditions with a fluidized bed of a polymerization catalyst on a particulate support, the bed having a bottom and a top;

(a2) measuring the pressure at a plurality of different locations in the fluidized bed at increasing heights above the bottom, and below the top, of the bed;

(a3) using the pressure measurements obtained in (a2) to calculate the pressure drop between adjacent locations in the bed;

(a4) applying regression analysis to the calculations generated in (a3) to determine the variation in pressure drop with height above the bottom of the bed;

(a5) extrapolating the variation in pressure drop with bed height to determine the total height of the bed; and (a6) using the total bed height determined in (a5) as a variable in controlling the polymerization conditions.

In a further aspect, the present invention resides in a process for producing a polyolefin comprising:

(b1) contacting at least one olefin monomer under polymerization conditions with a fluidized bed of a polymerization catalyst on a particulate support, the bed having a bottom and a top;

(b2) measuring the pressure at a plurality of different locations in the fluidized bed at increasing heights above the bottom, and below the top, of the bed using pressure transducers;

(b3) using the pressure measurements obtained in (b2) to calculate the pressure drop between adjacent locations in the bed;

(b4) applying regression analysis to the calculations generated in (b3) to graph the variation in pressure drop with height above the bottom of the bed; and (b5) using the deviation of an actual pressure drop calculation from the graph generated in (b4) to identify a malfunctioning pressure transducer.

In yet a further aspect, the present invention resides in a process for producing a polyolefin comprising:

(c1) contacting at least one olefin monomer under polymerization conditions with a fluidized bed of a polymerization catalyst on a particulate support, the bed having a bottom and a top;

(c2) measuring the pressure at a plurality of different locations in the fluidized bed at increasing heights above the bottom, and below the top, of the bed using pressure transducers;

(c3) using the pressure measurements obtained in (c2) to calculate the pressure drop between adjacent locations in the bed;

(c4) applying regression analysis to the calculations generated in (c3) to graph the variation in pressure drop with height above the bottom of the bed; and (c5) using the graph generated in (c4) to calculate the profile of fluidized bed bulk density (FBD) with height using the formula $dp/dh=FBD*g$, where dp is the pressure drop between two different locations in the fluidized bed, dh is the difference in height of the two different locations and g is gravitational acceleration.

In the above-discussed process, the polymerization catalyst may include a metallocene. In embodiments, the at least one olefin monomer includes ethylene. In embodiments, the regression analysis applied in (a4) is linear. In embodiments, the regression analysis applied in (a4) is polynomial. In embodiments, the regression analysis applied in (a4) is second degree polynomial.

In embodiments, a method of producing a polymer includes contacting at least one monomer under polymerization conditions with a fluidized bed of a polymerization catalyst on a particulate support; measuring a plurality of pressures of the fluidized bed at a plurality of locations corresponding to increasing heights from a bottom of the fluidized bed; calculating a plurality of pressure drops between the plurality of locations based on the measured pressures; performing a regression analysis on the calculated plurality of pressure drops; correlating the plurality of pressure drops to corresponding heights of the fluidized bed based on the regression analysis; determining a height of the fluidized bed based on the correlating; and controlling polymerization conditions based on the determined height of the fluidized bed.

In embodiments, a method of detecting a malfunction in a pressure transducer of a fluidized bed includes measuring a plurality of pressures of the fluidized bed at a plurality of heights thereof via a plurality of pressure transducers, the fluidized bed being contacted with at least one monomer under polymerization conditions; calculating a plurality of pressure drops between the plurality of locations based on the measured pressures; performing a linear or polynomial regression analysis on the calculated plurality of pressure drops; comparing the regression analysis with the pressure drop calculation based on the actual measurements; and determining whether one of the pressure transducers is defective based on the comparison.

DETAILED DESCRIPTION OF THE EMBODIMENTS

Figure 1:
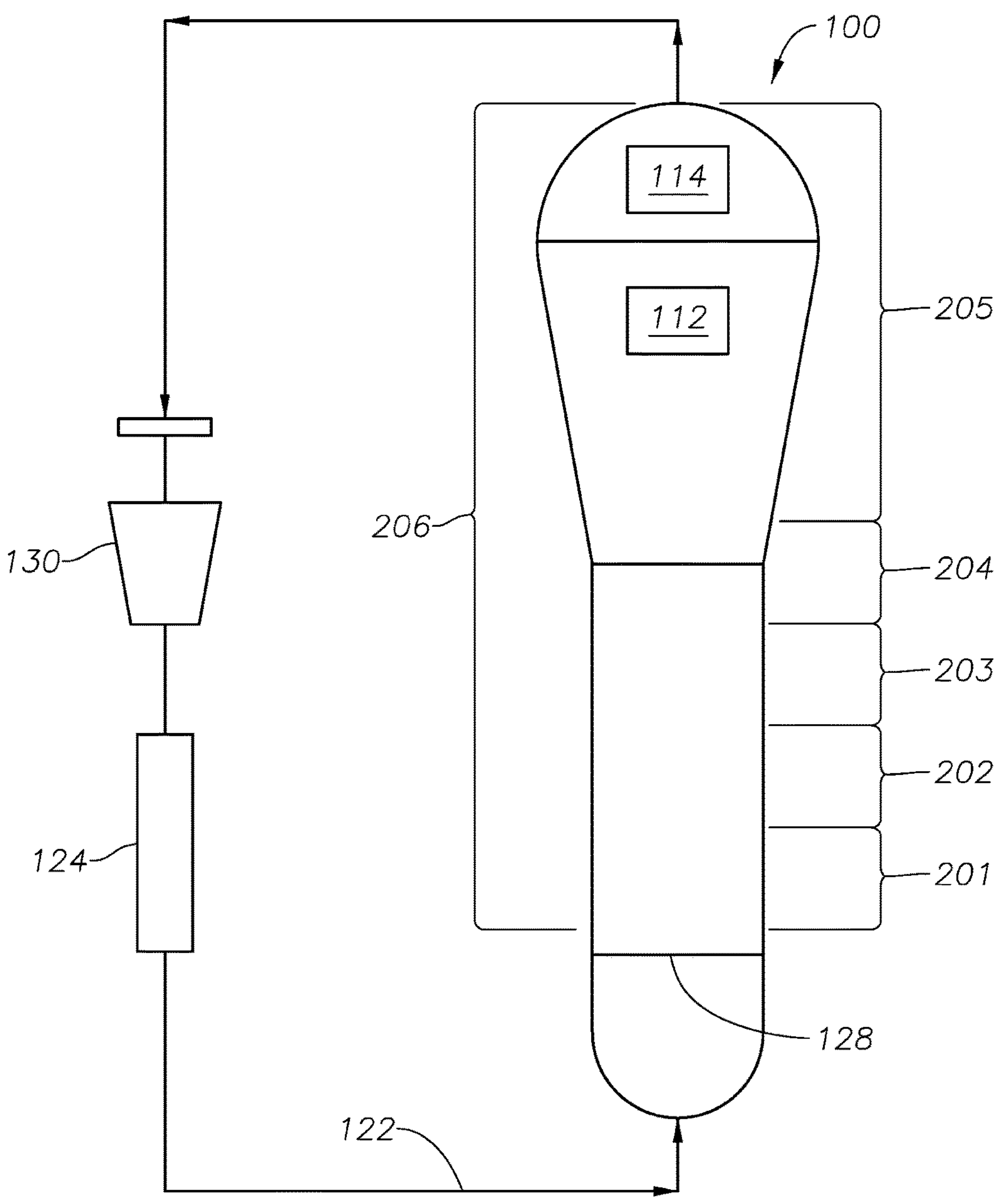
FIG. 1 is a schematic representation of the methods and systems illustrating implementation in a fluidized bed polymerization reactor system.

Described herein is a process of producing a polyolefin, in which at least one olefin monomer is contacted under polymerization conditions with a fluidized bed of a polymerization catalyst on a particulate support, the bed having a bottom and a top. The pressure is measured at a plurality of different locations in the fluidized bed at increasing heights above the bottom, and below the top, of the bed; and the measured pressures are used to calculate the pressure drop between adjacent locations in the bed. Regression analysis is applied to the calculated pressure drop between adjacent locations in the bed to determine the variation in pressure drop with height above the bottom of the bed and the variation in pressure drop with bed height is extrapolated to determine the total height of the bed. One can then control the polymerization conditions based at least in part upon the determined total bed height, e.g., such that the bed height is maintained within a desired range of values.

It is to be appreciated that the pressure measurements and pressure drop calculations can be performed by a single device, without the individual pressure measurements being displayed and/or recorded.

In another embodiment, a process is described for producing a polyolefin in which at least one olefin monomer is contacted under polymerization conditions with a fluidized bed of a polymerization catalyst on a particulate support, the bed having a bottom and a top. The pressure is measured at a plurality of different locations in the fluidized bed at increasing heights above the bottom, and below the top, of the bed using pressure transducers and the pressure measurements are used to calculate the pressure drop between adjacent locations in the bed. Regression analysis is then applied to the calculated pressure drops between adjacent locations in the bed to graph the variation in pressure drop with height above the bottom of the bed and the deviation of an actual pressure drop calculation from the graphed variation in pressure can be used to identify a malfunctioning pressure transducer.

In another embodiment, a method is described of detecting a malfunction in a plurality of pressure transducers of a fluidized bed, such as that used to polymerize at least one olefin monomer. The method comprises measuring a plurality of pressures of the fluidized bed at a plurality of heights thereof via the plurality of pressure transducers. The measured pressures are then used to calculate a plurality of pressure drops between the plurality of locations and (a) linear regression analysis or (b) polynomial regression analysis is performed on the calculated pressure drops to graph the variation in pressure drop with bed height calculated. Using the pressure drop gradient from the linear or polynomial regression analysis it is possible to determine the variation of bulk density across the fluidized bed. As indicated above, the bulk density profile across the fluidized bed is a measure of reactor stability and resin morphology and can therefore also be used to monitor reactor operation.

In the above-discussed processes the polymerization catalyst may include a metallocene. In embodiments, the at least one olefin monomer includes ethylene. In embodiments, the regression analysis is linear. In embodiments, the regression analysis is polynomial. In embodiments, the regression analysis is second degree polynomial.

FIG. 1 is a schematic representation of methods and systems illustrating typical operations in a fluidized bed polymerization reactor system. In FIG. 1, a bulk material is present in a fluidized bed polymerization reactor vessel 100. Such bulk material can be gaseous, liquid, and/or solid material. In a reactor system, illustrative bulk materials may include one or more of reaction raw materials such as feedstocks, reaction products such as polymer particles, reaction adjuncts such as catalysts, reaction byproducts, and the like, as well as other materials. A desired operating temperature for producing a polyolefin in the fluidized bed reactor system is selected. A metallocene catalyst may be selected based on one or more desired properties of the polyolefin achieved at the selected operating temperature. Monomers are contacted with the catalyst in the fluidized bed reactor vessel 100. A recycle stream in a recycle line 122 of the fluidized bed reactor vessel 100 is cooled in order to maintain the desired operating temperature. Typically, fouling can be considered to be minimized if the reactor system can operate at least about 3 months without requiring opening of the reactor system for cleaning. In other cases, fouling is considered minimized if the reactor system can operate 6 months, 9 months, 1 year, or 2 years without requiring opening of the reactor system for cleaning.

A conventional fluidized bed polymerization process for producing resins and other types of polymers is typically conducted by passing a gaseous stream containing one or more monomers continuously through a fluidized bed reactor under reactive conditions and in the presence of catalyst at a velocity sufficient to maintain the bed of solid particles in a suspended condition. A continuous cycle is typically employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed at compressor 130, cooled at heat exchanger 124, and recycled into the reactor vessel 100. Monomer may be added to the system, e.g., into the recycle stream or reactor vessel, to replace polymerized monomer.

The reaction zone 112 typically includes a bed of growing polymer particles, formed polymer particles, and an amount of catalyst all fluidized by the continuous flow of polymerizable and modifying gaseous components, in the form of make-up feed and recycle fluid through the reaction zone 112. To maintain a viable fluidized bed, it is advantageous that the superficial gas velocity through the bed exceeds the minimum flow required for fluidization. On start-up, the reactor is generally charged with a bed of polymer particles, seed bed, before gas flow is initiated. Such particles help to prevent the formation of localized "hot spots" when catalyst feed is initiated. The particles may be the same as the polymer to be formed or different. When different, they are preferably withdrawn with the desired newly formed polymer particles as the first product. Eventually, a fluidized bed consisting of desired polymer particles supplants the start-up bed.

The fluidized bed has the general appearance of dense mass of individually moving particles as created by the percolation of gas through the bed. The pressure drop through the bed is equal to or slightly greater than the weight of the bed divided by the cross-sectional area. Referring to FIG. 1, make-up fluids can be fed via line 122 or other lines connecting to the reactor vessel 100. The composition and amount of the make-up stream is adjusted accordingly to maintain an essentially steady state composition within the reaction zone 112. To ensure complete fluidization, the recycle stream and, where desired, at least part of the make-up stream can be returned through recycle line 122 to the reactor, for example below the bed. There may be a gas distributor plate 128 downstream of the point of return to aid in uniformly fluidizing the bed and to support the solid particles prior to start-up or when the system is shut down. The stream passing upwardly through and out of the bed contributes to removing the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover. The recycle stream is then compressed in compressor 130 and passed through heat exchanger 124 where the heat of reaction is removed from the recycle stream before it is returned to the bed. The heat exchanger 124 may also be positioned before the compressor 130. The recycle stream exiting the heat exchange zone is then returned to the reactor and thence to the fluidized bed through gas distributor plate 128. The reactor illustrated in FIG. 1 is useful for forming polyolefins such as polyethylene, polypropylene, etc. A monomer feed line may also be coupled to the reactor system for adding a monomer to the reactor system.

In FIG. 1, a plurality of pressure measurements can be taken at locations 201, 202, 203, 204, and 205, or any number and arrangement of locations along the fluidized bed vessel, with total pressure drop across the vessel being labeled as 206. Each of a combination of these pressure readings will form one point on the pressure drop versus height graph which will be used in the regression model development.

Figure 2:
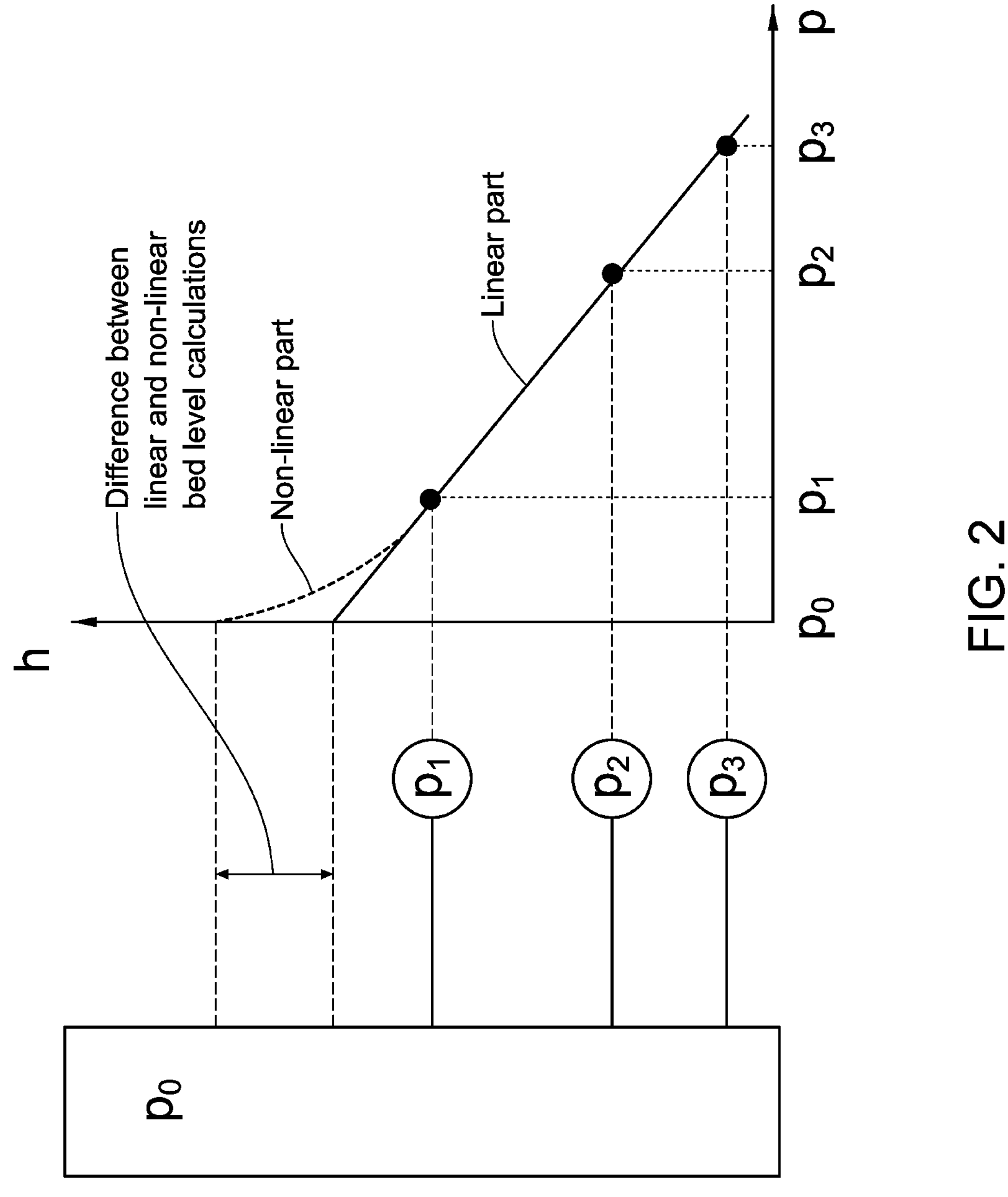
FIG. 2 is a graph illustrating the pressure drop across the height of a fluidized bed polymerization reactor system.

FIG. 2 is a graph illustrating the pressure drop calculated across the length of a fluidized bed polymerization reactor system. Typically, the pressure drop calculated across the vertical length, or height, of the bubbling fluidized bed decreases almost linearly from the bottom of the fluidized bed to the top of the fluidized bed. The pressure may deviate from linearity near the bed surface because of bubble expansion and eruption. The calculated pressure drop typically approaches zero at the surface of the fluidized bed. It is common for Gas Phase Polyethylene (GPPE) reactors to have at least three pressure drop calculations across the reactor, as schematically illustrated in FIG. 2. At least two (2) pressure measurements are needed to find a linear relationship between the calculated pressure drop and the height of the fluidized bed, but more measurements may result in an improved linear regression. In order to find a second-degree polynomial, at least three (3) pressure measurements are needed in order take into account the non-linearity of the pressure profile of the fluidized bed near the fluidized bed surface.

In the example illustrated in FIG. 2, pressure drops are calculated at three (3) different points: at 27 ft from the bottom ("$p_3$") of the bed, at 9 ft from the bottom ("$p_2$") and at 0.5 ft from the bottom ("$p_1$"). Accordingly, the pressure drop at 0.5 ft from the bottom ("$p_1$") is calculated as the sum of the pressure drop measurements at 9 ft−0.5 ft, 27 ft−9 ft, and top−27 ft. Specifically, the pressure drop at 0.5 ft from the bottom ("$p_1$") is equal to:

$$p_1=(P_{top}-P_{27})+(P_{27}-P_9)+(P_9-P_{0.5}).$$

The pressure drop at the next height of the bed ("$p_2$"), in this case at 9 ft, is calculated as the sum of the pressure drop measurements at 27 ft−9 ft, and top−27 ft. Specifically, the pressure drop at 9 ft from the bottom ("$p_2$") is equal to:

$$p_2=(P_{top}-P_{27})+(P_{27}-P_9).$$

The pressure drop at the next height of the bed ("$p_3$"), in this example at 27 ft, is calculated as the pressure drop measurement at (top−27). Specifically, the pressure drop at 27 ft from the bottom (p$P_3$") is equal to:

$$p_3=(P_{top}-P_{27}).$$

Sometimes, one or more of the pressure drop calculations may produce an incorrect reading due to blockage or other reasons such as malfunction of the pressure measurement devices. This incorrect reading may reveal itself as a deviation from linearity. Although small decreases of the bulk density with respect to height are typically expected, large decreases or increases of the bulk density may be a sign of a measurement failure. However, it is difficult to determine with certainty which measurements are wrong as typically there is no expected value of the pressure drop available. It is also advantageous in this case to rely on all of the measurements in order to decrease the contribution of any one failed measurement.

Figure 3:
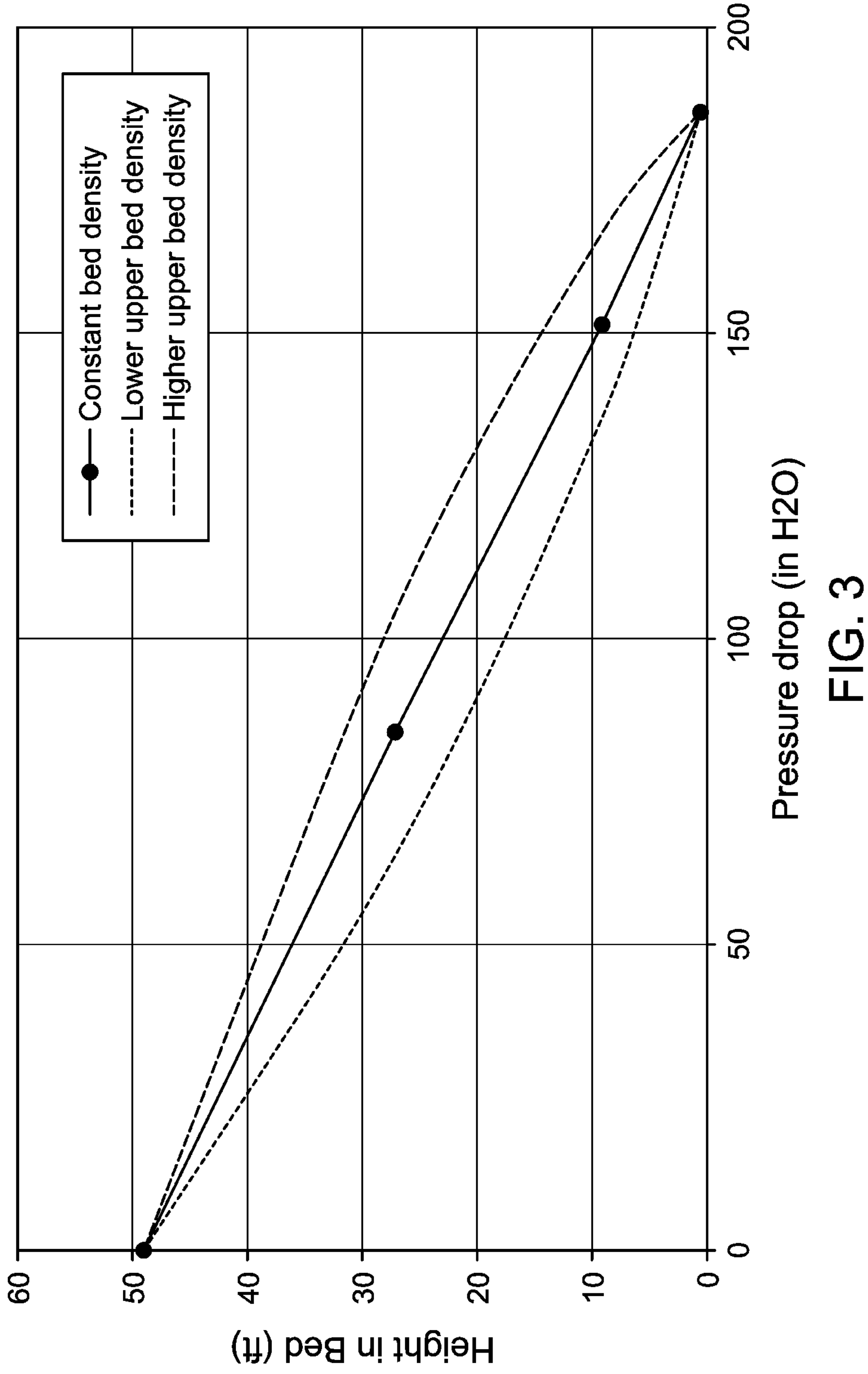
FIG. 3 is a graph illustrating different pressure drop profiles that may appear in a fluidized bed with respect to the height of the fluidized bed.

FIG. 3 is a graph illustrating the calculated pressure drop in a fluidized bed with respect to the height of the fluidized bed. FIG. 3 illustrates three (3) scenarios that may happen when plotting the calculated pressure drop data versus the height of the fluidized bed, without taking into account the near surface region where the calculated pressure drops to near zero. The first scenario is when there is a constant density of the fluidized bed across the height of the fluidized bed, the graph is linear, as illustrated by the middle graph that includes black circles. The second scenario is when the bulk density of the fluidized bed decreases with height, thus resulting in a lower density of the upper fluidized bed, and as a result a concave curve will form, as illustrated in FIG. 3 with the bottom straight line curve having a concave shape. The third scenario is when the bulk density of the fluidized bed increases with height, in which case the graph is a convex curve, as illustrated with the upper line including dashes and having a convex shape.

Typically, while the concave curvature (bottom curve) can naturally occur because of axial size segregation and bubble growth, the convex curve typically occurs when a portion of the bed is defluidized, either because the contents of the bed adhere to the wall or aggregate on the distributor plate near the bottom of the reactor vessel such distributor plate 128 illustrated in FIG. 1, and thus are no longer supported by the gas flow. In this case, the calculated pressure drop decreases, resulting in a lower bulk density and giving the impression that less material is present in the bed. As a result, the calculated pressure drop is greater compared to the case where the bed is not defluidized because of aggregation of adhesion to the wall.

Typically, if the measurements are correct, using a polynomial model to predict the height of the fluidized bed yields a higher pressure measurement than using a linear model to predict the height of the fluidized bed. Because the polynomial model takes into account the curvature of the calculated pressure drop that is due to the bed density difference along the height of the bed, the bed level calculated using the polynomial model is typically lower than the bed level calculated using the linear models. However, in some cases, the linear model predicts a higher pressure value indicating that the bed density increases in the upper regions of the fluidized bed and resulting in a convex curve as illustrated in FIG. 3. This inconsistency is typically due to a pressure transducer malfunction. Accordingly, in order to avoid false predictions for the height of the fluidized bed, the polynomial model should be used as the primary model, and the linear model should only be used in case of pressure transducer malfunction. If the transducer readings are trusted, this will give a quick warning of a serious issue such as partial de-fluidization, as discussed before, in the bed.

Figure 4:
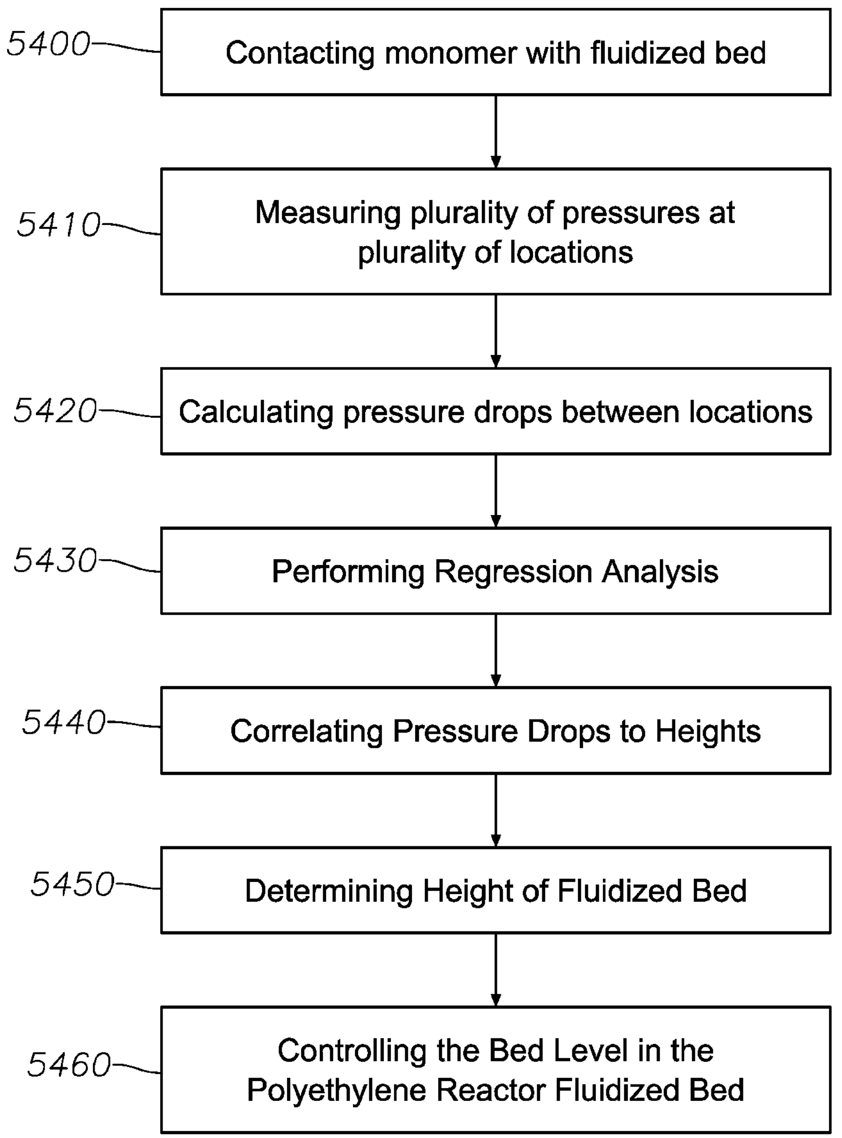
FIG. 4 is a flow chart illustrating a method of applying the proposed bed level calculation procedure in fluidized bed, according to example embodiments.

FIG. 4 is a flow chart illustrating a method of producing a polymer via fluidized bed, according to example embodiments. In FIG. 4, the method of producing a polymer starts at step 5400, when a monomer is contacted with a fluidized bed of a polymerization catalyst on a particulate support under polymerization conditions. In embodiments, the polymerization catalyst includes a metallocene catalyst. In embodiments, the polymerization catalyst includes a Ziegler Natta catalyst. In embodiments, the polymerization conditions include fluidized bed temperature, density of bulk material in the fluidized bed, nature of gas stream passing through the fluidized bed, pressure of the gas stream, velocity of the gas stream, and amount of monomer introduced in the fluidized bed. In embodiments, the polymer includes a polyolefin. In embodiments, the monomer includes an olefin monomer. In embodiments, the olefin monomer includes ethylene.

At step 5410, a plurality of pressures are calculated along various heights of the fluidized bed. For example, the pressures are calculated at four (4) different points: 0.5 ft from the bottom of the fluidized bed, 9 ft from the bottom of the fluidized bed, 27 ft from the bottom of the fluidized bed, and at the top of the fluidized bed. In embodiments, the pressures are measured using pressure transducers located at the various heights.

At step 5420, in embodiments, pressure drops are calculated between the various heights. Accordingly, the pressure drop at 0.5 ft from the bottom is calculated as the sum of the pressure drop calculations at 9 ft−0.5 ft, 27 ft−9 ft, and top−27 ft. Specifically, the pressure drop at 0.5 ft from the bottom of the fluidized bed is equal to:

$$(P_{top}-P_{27})+(P_{27}-P_9)+(P_9-P_{0.5}).$$

The pressure drop calculated at the next height of the bed, in this example 9 ft, is calculated as the sum of the pressure drop calculations at 27 ft−9 ft, and top−27 ft. Specifically, the pressure drop at 9 ft from the bottom is equal to:

$$(P_{top}-P_{27})+(P_{27}-P_9).$$

The pressure drop corresponding to the next height, in this example 27 ft, is calculated as the pressure drop measurement at (top−27). Specifically, the pressure drop at 27 ft from the bottom is equal to:

$$(P_{top}-P_{27}).$$

At step 5430, a regression analysis is performed on the calculated pressure drops. In embodiments, the regression analysis is a linear regression analysis. In embodiments, the regression analysis is a polynomial regression analysis, for example a second degree polynomial regression analysis. At step 5440, based on the regression analysis performed on the calculated pressure drops in step 5430, the pressure drops are correlated to various heights of the fluidized bed. For example, pressure drops at heights other than the heights of 0.5 ft, 9 ft, 27 ft and the top of the fluidized bed are derived from the regression analysis, and a profile of the pressure drops can be drawn based on the regression analysis. At step 5450, the height of the fluidized bed can then be calculated based on the regression analysis. At step 5460, the bed level in the polyethylene fluidized bed reactor can be controlled which has a direct effect on plate fouling and sheeting in the reactor.

Figure 5:
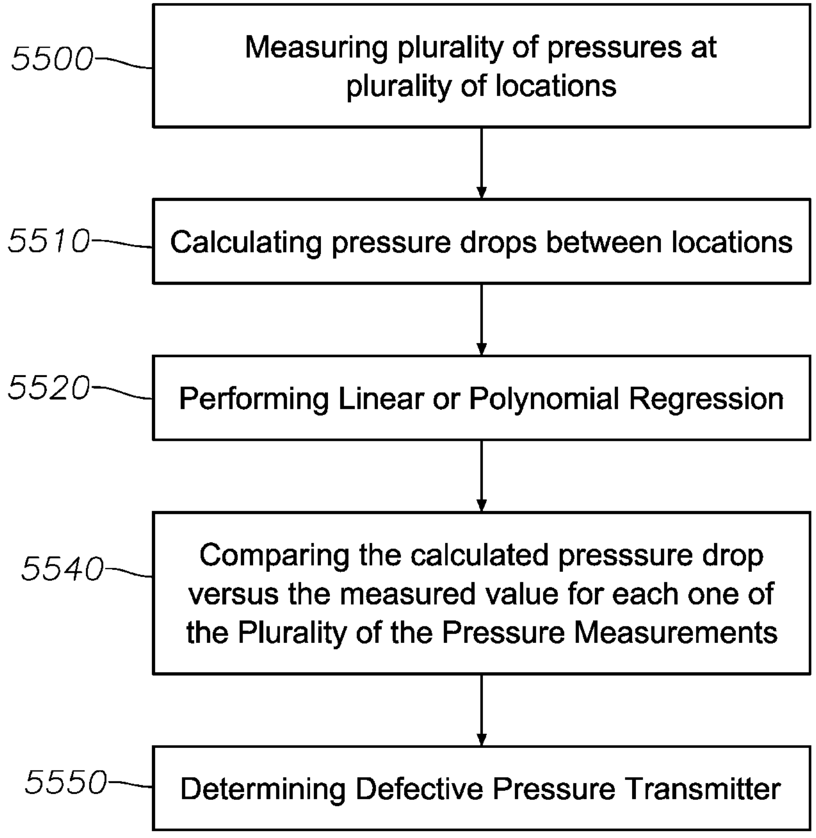
FIG. 5 is a flow chart illustrating a method of determining a defective pressure transducer in a fluidized bed, according to example embodiments.

FIG. 5 is a flow chart illustrating a method of determining a defective pressure transmitted in a fluidized bed, according to example embodiments. In FIG. 5, the method starts at step 5500 where a plurality of pressures are measured at a plurality of heights of the fluidized bed. In embodiments, the fluidized bed is contacted with at least one monomer under polymerization conditions. In embodiments, the at least one monomer includes at least one olefin monomer such as, for example, ethylene. At step 5510, a plurality of pressure drops between the plurality of heights are calculated based on the measured plurality of pressures. In embodiments, the plurality of pressure drops are calculated between adjacent locations along the height of the fluidized bed. For example, pressure differences are calculated between each height at (9 ft−0.5 ft), (27 ft−9 ft) and (top−27 ft). In embodiments, the pressure drop corresponding to the lowest height, in this example 0.5 ft, is calculated as the sum of the differences of the pressures drops of (9 ft−0.5 ft), (27 ft−9 ft) and (top−27 ft). The pressure drop corresponding to the next height, in this example 9 ft, is calculated as the sum of the differences of the pressures drops of (27 ft−9 ft) and (top−27 ft). The pressure drop corresponding to the next height, in this example 27 ft, is calculated as the difference of the pressures drops of (top−27 ft).

In embodiments, at step 5520, a linear regression analysis is performed on the calculated pressure drops. In embodiments, performing the linear or regression polynomial regression analysis includes calculating a height of the fluidized bed based on the linear regression analysis. In embodiments, the polynomial regression analysis is a second degree polynomial regression analysis.

At step 5540, the pressure drop from linear regression or the polynomial regression analysis is compared with the pressure drop from actual pressure measurements. In embodiments, any of the values of the actual pressure drop measurements that deviate significantly from the predicted values is flagged as a defective measurement, e.g., as part of step 5550 (determining defective pressure transducer).

Figure 6:
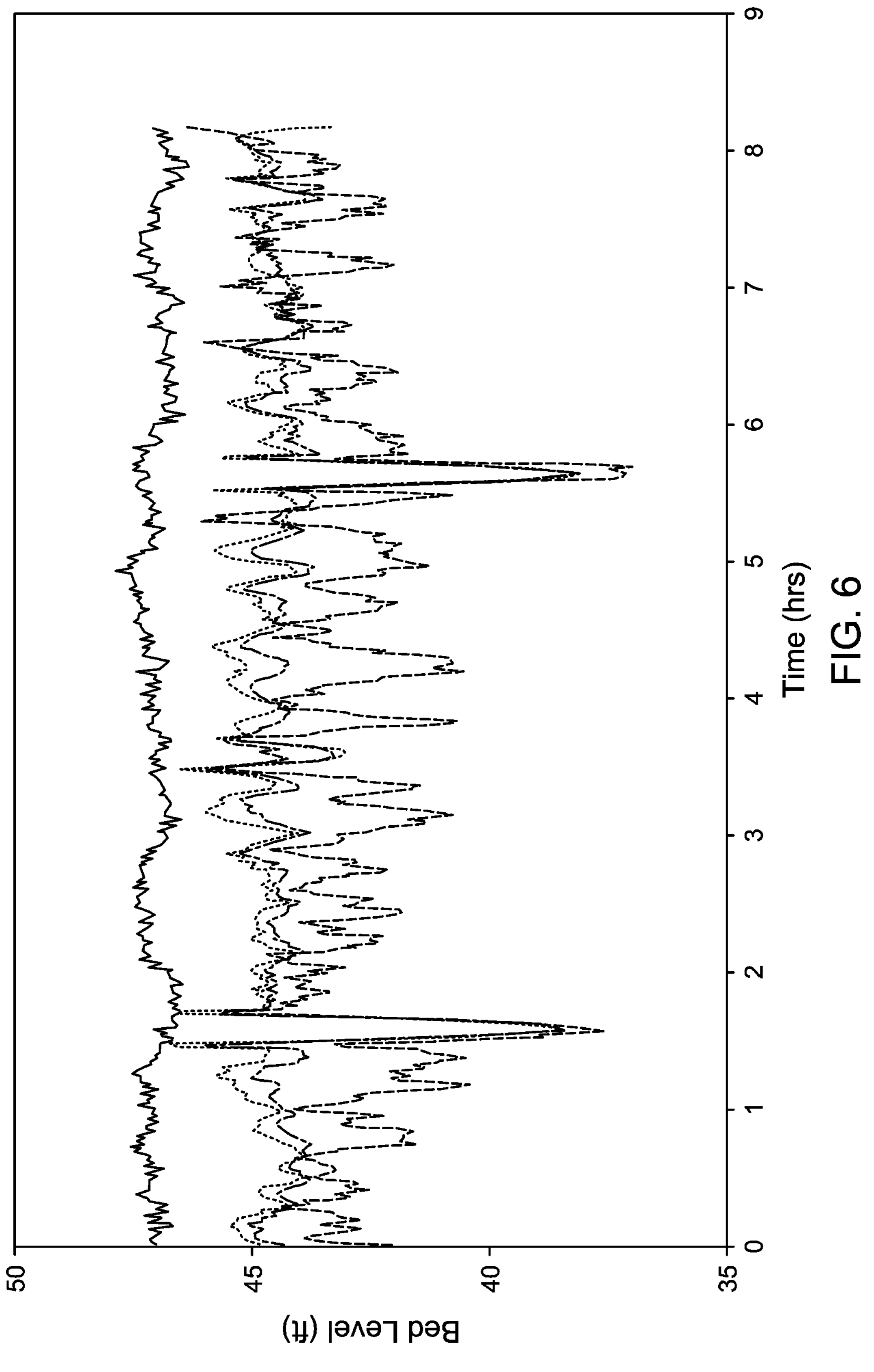
FIG. 6 is a graph illustrating a comparison of bed level predictions between different linear models, according to example embodiments.

FIG. 6 is a graph illustrating a comparison of bed level predictions between different linear models and the method currently implemented in the distributed control system (DCS), according to example embodiments. FIG. 6 provides a comparison between the bed level predictions from the linear models and the DCS bed level for a given time period.

In FIG. 6, the uppermost curve corresponds to bed levels calculated via the DCS, the second uppermost curve corresponds to the bed levels calculated via the linear model by using the pressure measurements 202 and 203 illustrated in FIG. 1, the third uppermost curve corresponds to bed levels calculated via the linear model by using the pressure measurements 201 and 202 illustrated in FIG. 1, and the lowermost curve corresponds to bed levels calculated via the linear model by using the pressure measurements 201, 202 and 203 illustrated in FIG. 1 (with reference also to FIG. 2 and the previous discussion regarding derivation of the model, using example distances in ft. along the height of the fluidized bed). Accordingly, FIG. 6 shows that all of the linear models generally predict bed levels that are about 2-3 ft smaller compared to the data from the DCS. Such difference is likely due to the contribution from gas column pressure drop that is not accounted for in the DCS values. Furthermore, as can be seen, the DCS model is not as sensitive to the fluctuations in the bed level, which is the characteristics of a fluidized bed, as the current model.

Figure 7:
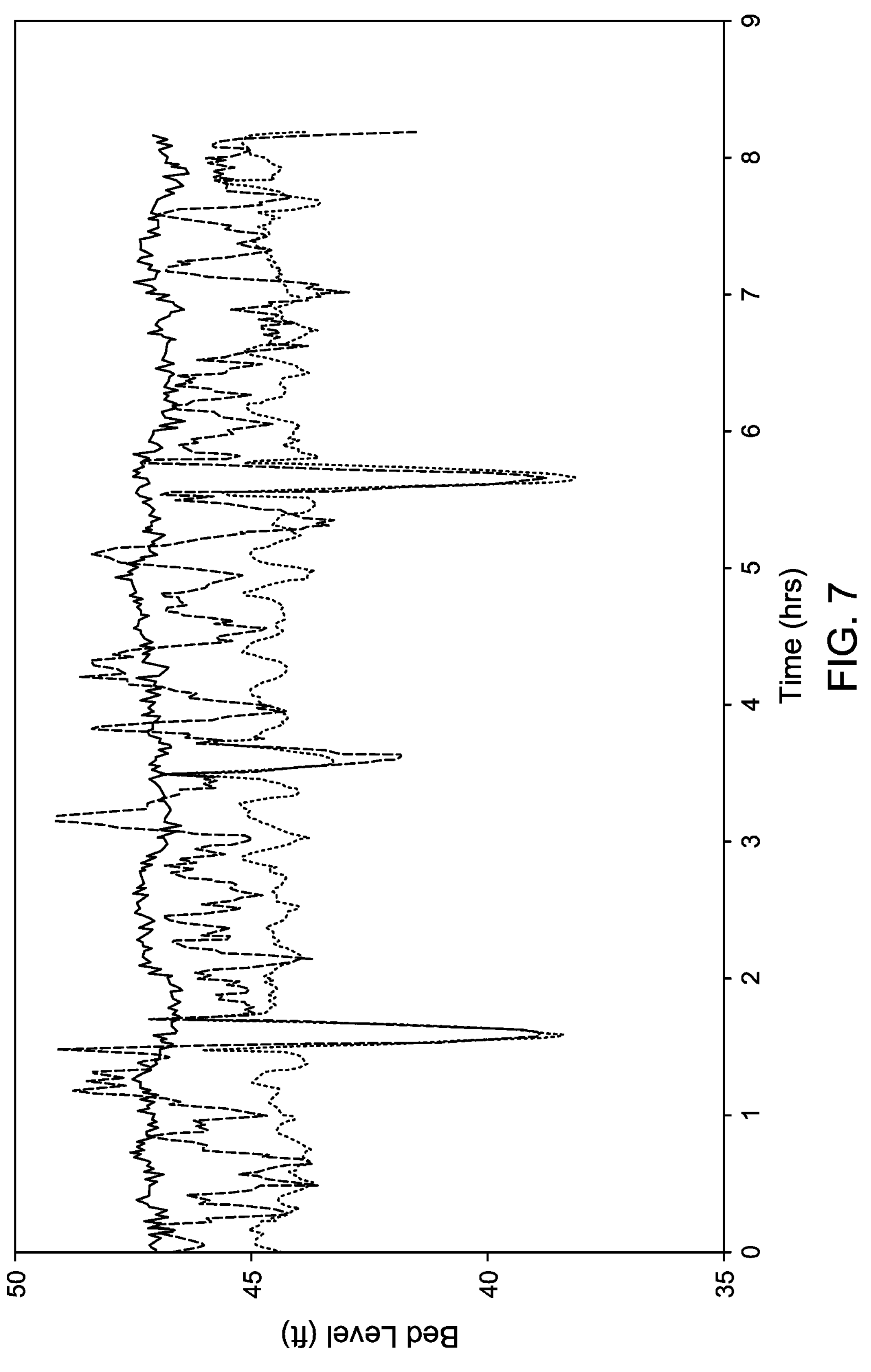
FIG. 7 is a graph illustrating a comparison of bed level predictions between linear models, polynomial models and actual measurements according to example embodiments.

FIG. 7 is a graph illustrating a comparison of bed level predictions between the bed level calculations by linear models, polynomial models, and the DCS for a given time period. In FIG. 7, the uppermost curve corresponds to bed levels calculated via the DCS, the second uppermost curve corresponds to bed levels calculated via the linear model by using the pressure measurements 201, 202 and 203 illustrated in FIG. 1 (which may correspond respectively to pressure measurements p1, p2 and p3 of FIG. 2), and the lowermost curve corresponds to bed levels calculated via a second degree polynomial model by using the pressure measurements 201, 202 and 203 illustrated in FIG. 1 (p1, p2, and p3 of FIG. 2). As illustrated in FIG. 7, the bed levels predicted via the second degree polynomial model are typically higher than the bed levels predicted via the linear model (following the general phenomenon illustrated in FIG. 2). However, in some instances, the linear model predicts a higher bed level value. The cases where the linear model predicts higher bed level values than the polynomial model typically mean that there is a bed density increase in the upper regions, most probably caused by transducer malfunction. For example, such density increase would have created a convex curvature as discussed above with respect to FIG. 3. Because the polynomial model takes into account the curvature due to the axial bed density difference, it is possible to deduce that the bed level calculated using the polynomial model can only be lower than the bed level calculated using the linear models if the graph is convex. To avoid the false predictions from the polynomial model in this situation, it is preferable to use the polynomial model as the primary model, and switch to the linear model in such particular situations. As a result, the problem caused by the faulty pressure readings can be constrained.

Figure 8:
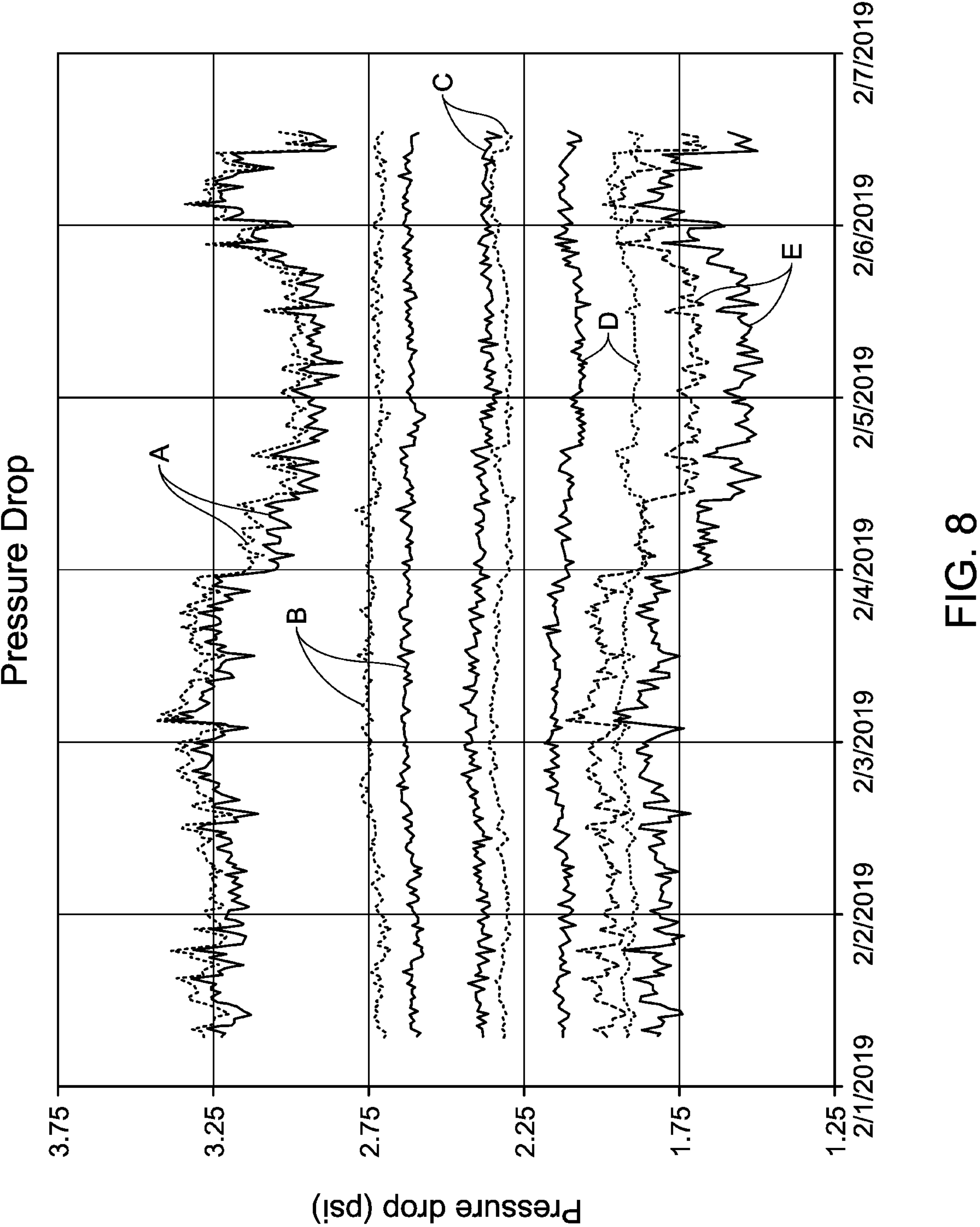
FIG. 8 illustrates a comparison of pressure drop from actual measurements and from model predictions, according to example embodiments.

FIG. 8 compares the pressure drop values at different heights calculated from actual pressure measurements (illustrated by solid lines) with the values calculated in accordance with embodiments of the current invention (illustrated in dashed lines), for each of various heights A, B, C, D, and E (that is, such that each label A, B, C, D, E on FIG. 8 identifies a solid- and dashed-line pair for a given height). The embodiments of the current invention find the calculated pressure drop variation in relation to the bed height, as discussed above with respect to FIGS. 4 and 5, and calculate the pressure drop for each segment. As illustrated, the method according to the current invention shows which measurements are drifting from the expected trend. As can be seen, some of the measurements in this period are trending close to the expected values, and some show more variation.

Figure 9:
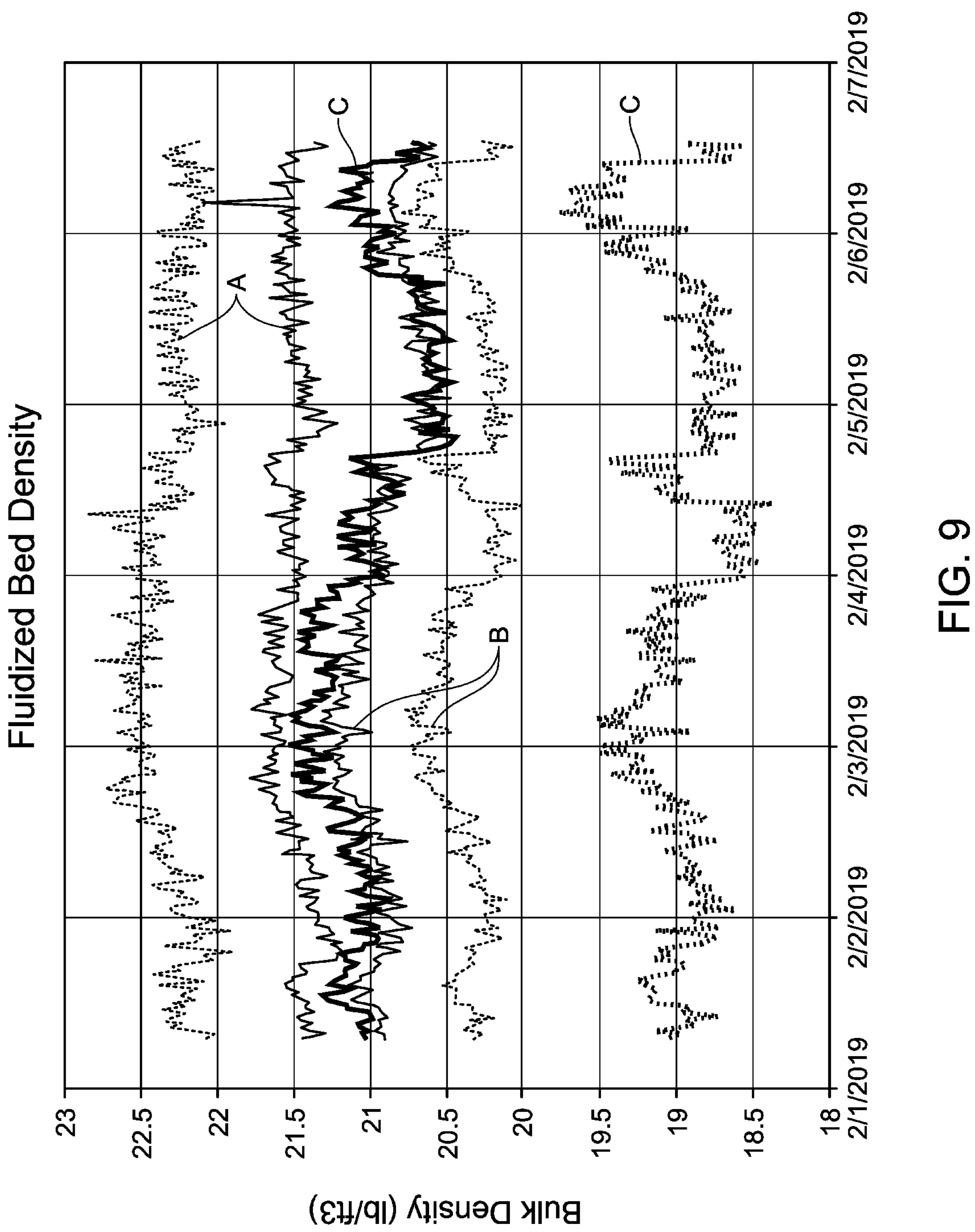
FIG. 9 is a graph illustrating a comparison of fluidized bed bulk density from DCS models and the predictions from polynomial models, according to example embodiments.

FIG. 9 is a graph illustrating a comparison of the fluidized bed bulk density calculations at different heights of the bed from DCS (illustrated in solid lines) with the values calculated with embodiments of the current invention (illustrated in dashed lines), for each of various heights A, B, and C (that is, such that each label A, B, C on FIG. 9 identifies a solid- and dashed-line pair for a given height).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A process for producing a polyolefin comprising:

(a1) contacting at least one olefin monomer under polymerization conditions with a fluidized bed of a polymerization catalyst on a particulate support, the bed having a bottom and a top;

(a2) measuring the pressure at a plurality of different locations along the fluidized bed at increasing heights above the bottom, and below the top, of the bed;

(a3) using the pressure measurements obtained in (a2) to calculate the pressure drop between adjacent locations along the bed;

(a4) applying regression analysis to the calculations generated in (a3) to determine the variation in pressure drop with height above the bottom of the bed;

(a5) extrapolating the variation in pressure drop with bed height to determine the total height of the bed; and (a6) controlling the polymerization conditions based at least in part upon the total bed height determined in (a5).

2. The process of claim 1, wherein controlling the polymerization conditions comprises maintaining the fluidized bed within a desired range of fluidized bed height.

3. The process of claim 1, wherein the polymerization catalyst comprises a metallocene, and/or the at least one olefin monomer comprises ethylene.

4. The process of claim 1, wherein the regression analysis applied in (a4) is linear.

5. The process of claim 1, wherein the regression analysis applied in (a4) is polynomial.

6. The process of claim 5, wherein the regression analysis applied in (a4) is second degree polynomial.

* * * * *